(12) United States Patent
Qin et al.

(10) Patent No.: US 8,454,346 B2
(45) Date of Patent: Jun. 4, 2013

(54) MOLD FOR FORMING A PRODUCT WITH A THROUGH HOLE

(75) Inventors: Sheng-Chang Qin, Shenzhen (CN); Zhong-Jie Luo, Shenzhen (CN); Chao Tang, Shenzhen (CN); Jian-Hui Dai, Shenzhen (CN); Te-Sheng Jan, New Taipei (TW); Chun-Che Yen, New Taipei (TW); Yu-Tao Chen, New Taipei (TW)

(73) Assignees: Hong Fu Jin Precision Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 59 days.

(21) Appl. No.: 13/241,142

(22) Filed: Sep. 22, 2011

(65) Prior Publication Data

US 2012/0164262 A1    Jun. 28, 2012

(30) Foreign Application Priority Data

Dec. 28, 2010    (CN) .......................... 2010 1 0609204

(51) Int. Cl.
  *B29C 45/17*    (2006.01)
(52) U.S. Cl.
  USPC ..................... 425/468; 425/577; 425/DIG. 10
(58) Field of Classification Search
  USPC ............ 425/414, 468, 577, DIG. 10, DIG. 12
  See application file for complete search history.

(56) References Cited

U.S. PATENT DOCUMENTS

| | | | | |
|---|---|---|---|---|
| 4,647,419 A | * | 3/1987 | Helfer et al. .................. | 425/468 |
| 4,750,876 A | * | 6/1988 | Lawson ......................... | 425/468 |
| 8,215,942 B2 | * | 7/2012 | Huang ........................... | 425/468 |
| 8,267,584 B2 | * | 9/2012 | Beneker et al. ............... | 248/430 |

FOREIGN PATENT DOCUMENTS

| | | |
|---|---|---|
| CN | 201169027 Y | 12/2008 |
| CN | 101450522 A | 6/2009 |
| JP | 61-261015 A | 11/1986 |
| TW | I258421 | 7/2006 |

\* cited by examiner

*Primary Examiner* — Tim Heitbrink
(74) *Attorney, Agent, or Firm* — Altis Law Group, Inc.

(57) ABSTRACT

A mold includes a female mold defining a receiving space and a male mold including a body and a core protruding from the body. The male mold and the female mold cooperatively define a molding cavity for forming a molding product. The core includes a distal end portion inserted into the receiving space. The distal end portion is configured for forming a through hole of the molding product. The female mold includes two protruding ribs arranged at a parting line between the female mold and the core. The protruding ribs of the female mold is located on opposite sides of the distal end portion, and extend around the distal end portion. The core includes two protruding ribs formed on the distal end portion at the parting line between the female mold and the core. The protruding ribs of the core extend around the distal end portion.

2 Claims, 3 Drawing Sheets

MOLD FOR FORMING A PRODUCT WITH A THROUGH HOLE

BACKGROUND

1. Technical Field

The present disclosure relates to a mold for use in a molding process.

2. Description of Related Art

Commonly, even when mold halves are fit tightly together, the molded articles are formed with burrs at parting lines, which can make it difficult to assemble the articles to other articles. Therefore, a mold that can overcome the above shortcoming is needed.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
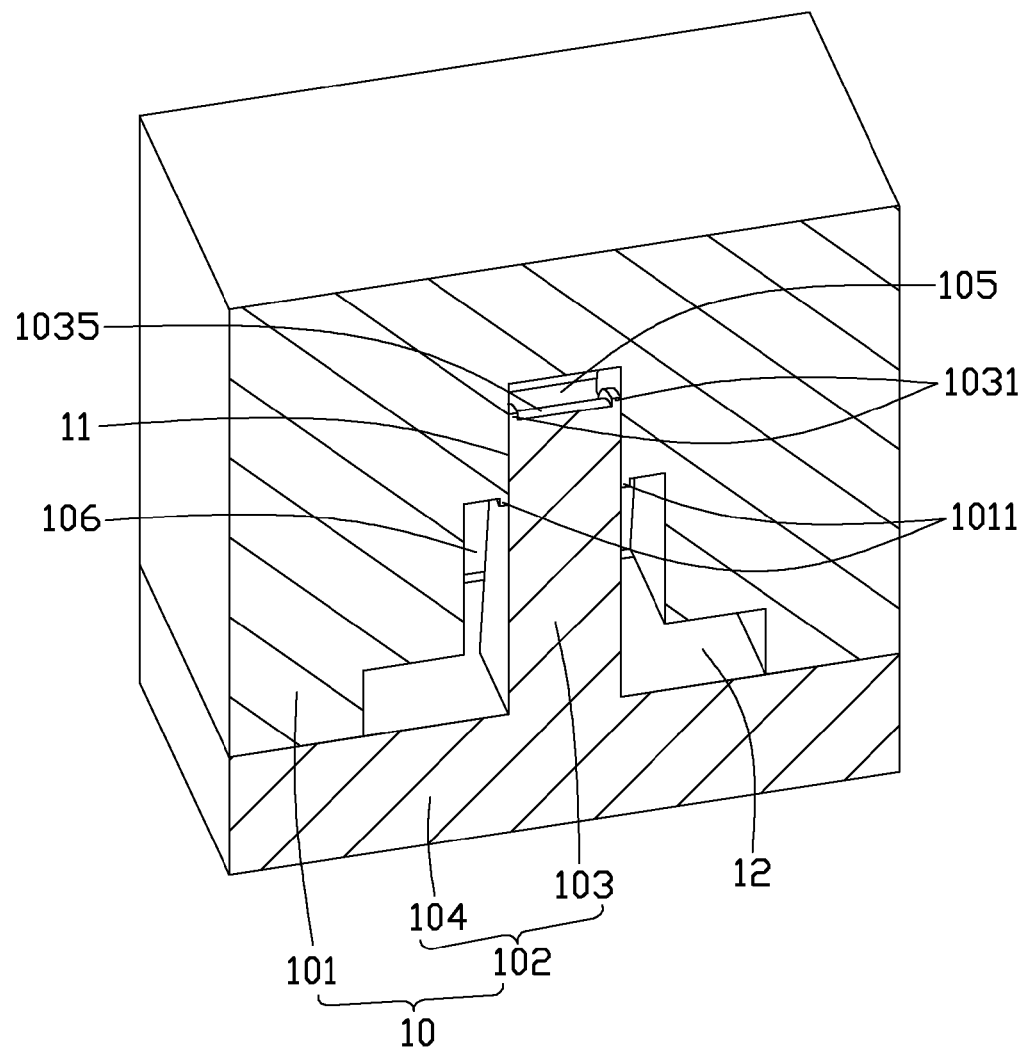
FIG. 1 is a cross-sectional view of a mold according to an exemplary embodiment.
Figure 2:
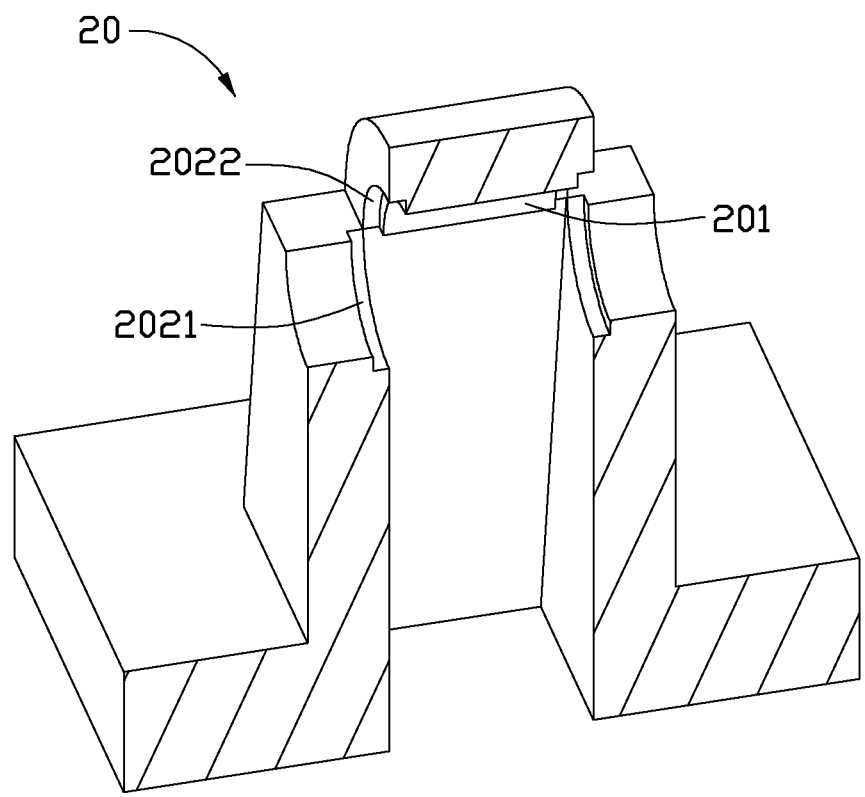
FIG. 2 is cross-sectional view of a product molded by the mold of FIG. 1 without burrs.

Referring to FIGS. 1 and 2, a mold 10 includes a female mold 101 and a male mold 102. The male mold 102 includes a body 104 and a core 103 protruding from the body 104. The female mold 101 includes a receiving space 105 and a stepped hole 106 communicating with the receiving space 105. When the male 102 is attached to the female mold 101, the core 103 extends through the stepped hole 106 and is inserted into the receiving space 105, and a mold cavity 12 is defined by the female mold 101 and the male mold 102 for forming a molding product 20.

The core 103 includes a distal end portion 1035 inserted into the receiving space 105 and exposed in the molding cavity 12. The distal end portion 1035 has a round cross-section. The distal end portion 1035 is configured for forming a through hole 201 of the molding product 20. Two opposite sides of the distal end portion 1035 is respectively brought into contact with two opposite inner surfaces of the female mold 101 in the receiving space 105. The core 103 includes two protruding ribs 1031 formed on the distal end portion 1035 at a parting line 11 between the female mold 101 and the core 103. The protruding ribs 1031 of the core 103 extend around the distal end portion 1035. The female mold 101 includes two protruding ribs 1011 arranged at the parting line 11 between the female mold 101 and the core 103. The protruding ribs 1011 of the female mold 101 are located on opposite sides of the distal end portion 1035, and extending around the distal end portion 1035.

In FIG. 2, the molding product 20 includes the through hole 201 and two pairs of recesses 2021, 2022. The recesses 2021, 2022 communicate with the through hole 201. The recesses 2021, 2022 respectively correspond to the protruding ribs 1011, 1031. In FIG. 2, the molding product 20 is shown as ideal, that is, without burrs.

Figure 3:
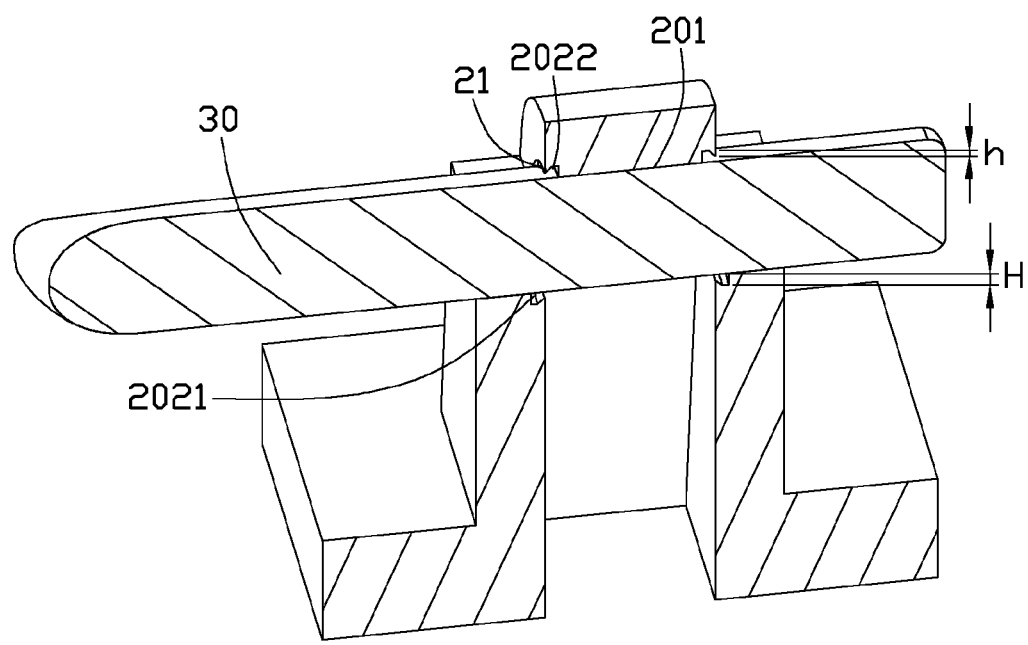
FIG. 3 illustrates a molded product having burrs with a shaft extending therethrough.

Referring to FIG. 3, the through hole 201 is molded by the core 103. When burrs 21 are formed at a sidewall surrounding the recesses 2021, 2022, it was found by experimentation that the height of the burrs 21 will usually be smaller than a value h. Therefore, the ribs 1011, 1031 are configured to have a height H greater than the value h. The depth of the recesses 2021, 2022 is thus about H. Thus, a shaft 30 extending through the through hole 201 will not engage with the burrs 21, allowing assembly without interference from burrs.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A mold for forming a molding product having a through hole, the mold comprising:

a female mold defining a receiving space; and a male mold attached to the female mold, the male mold comprising a body and a core protruding from the body, the core inserted into the receiving space of the female mold, the male mold and the female mold cooperatively defining a molding cavity for forming a molding product, the core comprising a distal end portion inserted into the receiving space and exposed in the molding cavity, the distal end portion configured for forming the through hole of the molding product, two opposite sides of the distal end portion being respectively brought into contact with two opposite inner surfaces of the female mold in the receiving space, the female mold comprising two protruding ribs arranged at a parting line between the female mold and the core, the protruding ribs of the female mold located on opposite sides of the distal end portion, and extending around the distal end portion, the core comprising two protruding ribs formed on the distal end portion at the parting line between the female mold and the core, the protruding ribs of the core extending around the distal end portion.

2. The mold of claim 1, wherein the distal end portion has a round cross-section.

* * * * *